(12) United States Patent
Gerlach et al.

(10) Patent No.: US 7,876,841 B2
(45) Date of Patent: Jan. 25, 2011

(54) METHOD FOR SCHEDULING OF USER TERMINALS TO SUBCARRIERS IN A MULTI-CELL OR MULTI-SECTOR NETWORK USING FDM TRANSMISSION, A BASE STATION, A USER TERMINAL AND A NETWORK THEREFOR

(75) Inventors: Christian Georg Gerlach, Ditzingen (DE); Andreas Weber, Boblingen (DE)

(73) Assignee: Alcatel Lucent, Paris (FR)

( * ) Notice: Subject to any disclaimer, the term of this patent is extended or adjusted under 35 U.S.C. 154(b) by 911 days.

(21) Appl. No.: 11/684,596

(22) Filed: Mar. 10, 2007

(65) Prior Publication Data
US 2007/0218840 A1    Sep. 20, 2007

(30) Foreign Application Priority Data
Mar. 20, 2006    (EP) .................................. 06290470

(51) Int. Cl.
*H04K 1/10*    (2006.01)
*H04L 27/28*    (2006.01)
(52) U.S. Cl. ...................................... 375/260
(58) Field of Classification Search ................. 375/147, 375/219, 260, 267, 324, 347, 299; 455/63.2, 455/437, 450, 525, 63.1, 67.11, 50, 436, 455/447, 518, 522; 370/296, 329, 332, 335, 370/336, 342, 345, 468
See application file for complete search history.

(56) References Cited
U.S. PATENT DOCUMENTS

| | | | |
|---|---|---|---|
| 6,542,742 B2 * | 4/2003 | Schramm et al. ............. | 455/436 |
| 7,006,795 B2 * | 2/2006 | Foschini et al. ............. | 455/63.1 |
| 2001/0038630 A1 | 11/2001 | Tong et al. | |
| 2005/0096062 A1 * | 5/2005 | Ji et al. ...................... | 455/450 |
| 2006/0014542 A1 * | 1/2006 | Khandekar et al. .......... | 455/447 |
| 2006/0094363 A1 * | 5/2006 | Kang et al. ................ | 455/63.1 |
| 2006/0223449 A1 * | 10/2006 | Sampath et al. ............... | 455/69 |

OTHER PUBLICATIONS

Alcatel; "System Simulation Results for Downlink Interference Coordination, Update," PP TSG RAN WG1 Meeting #44; No. R1-060689; Feb. 13, 2006; XP002387570; Denver, USA.

(Continued)

*Primary Examiner*—David C Payne
*Assistant Examiner*—Syed Haider
(74) *Attorney, Agent, or Firm*—Fay Sharpe LLP

(57) ABSTRACT

The invention concerns method for scheduling of user terminals (T) to subcarriers in a multi-cell or multi-sector network using FDM transmission with interference coordination and with the frequency band used for FDM transmission being subdivided into at least two frequency subsets (F1, F2 ... FR), whereby the data throughput of user terminals (T) is measured or modeled by means of the signal to interference ratio measured by said user terminals (T) dependent on the frequency subset (F1, F2 ... FR), subcarriers are allocated preferably to user terminals (T) with a high signal to interference ratio on said subcarriers, and subcarriers are allocated in clusters to the user terminals (T), whereby all clusters offer the same data throughput for the respective user terminal (T), a base station (BS), a user terminal (T) and a network therefor.

8 Claims, 4 Drawing Sheets

OTHER PUBLICATIONS

Samsung; "Flexible Fractional Frequency Reuse Approach;" PP TSG RAN WG1 Meeting #43; No. R1-051341; Nov. 7, 2005; XP002387571; Seoul, Korea.

3GPP; Technical Specification Group Radio Access Network: "Physical Layer Aspects for Evolved UTRA;" PP TR 25.814; Feb. 28, 2006; XP002387572.

ETRI; "Resource allocation for interference mitigation with symbol repetition in E-UTRA downlink;" 3GPP TSG RAN WG1 Meeting #42 BIS, No. R1-051085; Oct. 10, 2005; XP002387573; San Diego, USA.

Alcatel; "Interference coordination for evolved UTRA uplink access;" 3GPP TSG RAN WG1 ADHOC on LTE; No. R1-050593; Jun. 20, 2005; XP002387574; Sophia Antipolis, France.

Motorola; "Interference Mitigation via Power Control and FDM Resource Allocation and UE Alignment for E-UTRA Uplink and TP;" 3GPP TSG RAN WG1 Meeting #44; No. R1-060401; Feb. 13, 2006; XP002387575; Denver USA.

* cited by examiner

METHOD FOR SCHEDULING OF USER TERMINALS TO SUBCARRIERS IN A MULTI-CELL OR MULTI-SECTOR NETWORK USING FDM TRANSMISSION, A BASE STATION, A USER TERMINAL AND A NETWORK THEREFOR

The invention is based on a priority application EP 06290470.1 which is hereby incorporated by reference.

FIELD OF THE INVENTION

The invention relates to a method for scheduling of user terminals to subcarriers in a multi-cell or multi-sector network using FDM transmission with interference coordination and with the frequency band used for FDM transmission being subdivided into at least two frequency subsets, wherein
  either for at least one user terminal, the cell or sector being the source for the strongest interference for said at least one user terminal is determined, and based on the received power levels from serving and interfering cells or sectors measured by said at least one user terminal, a potential for signal to interference ratio improvement for said at least one user terminal is determined if said at least one user terminal is scheduled to a frequency subset that is restricted in power in said cell or sector being the source for the strongest interference for said at least one user terminal, or based on measurements where strongest interference is caused by a transmission of said at least one user terminal, or alternatively based on power levels from serving and interfering cells received by said at least one user terminal, the frequency subset is determined that is dedicated to bear interference in the cell or sector that is receiving the strongest interference from said at least one user terminal and is thus the preferred frequency subset,
  if there is a potential for signal to interference ratio improvement, said at least one user terminal is allocated to a group that is assigned to said frequency subset that is restricted in power and that provides for said improvement, or said at least one user terminal is allocated to a group that is assigned to said preferred frequency subset,
  subcarriers of a dedicated frequency subset are allocated in equal clusters to user terminals that are allocated to the group that is assigned to the dedicated frequency subset,
  when not enough subcarriers are left for allocation in said dedicated frequency subset, extended frequency bandwidth outside of said dedicated frequency subset is allocated in an amount offering the same data throughput as one of said equal clusters to the user terminals that are allocated to the group that is assigned to the dedicated frequency subset,
  and extended frequency bandwidth that is not yet allocated out of other frequency subsets is allocated in an amount offering the same data throughput as one of said equal clusters to user terminals that do not belong to one of said groups, a base station for scheduling of user terminals to subcarriers in a multi-cell or multi-sector network using FDM transmission with interference coordination and with the frequency band used for FDM transmission being subdivided into at least two frequency subsets, wherein the base station comprises at least one processing means adapted for
  either determination of a potential for signal to interference ratio improvement for at least one user terminal if said at least one user terminal is scheduled to a frequency subset that is restricted in power in a cell or sector being the source for the strongest interference for said at least one user terminal, based on the received power levels from serving and interfering cells or sectors of said at least one user terminal, or determination of a frequency subset that is dedicated to bear interference in the cell or sector that is receiving the strongest interference from said at least one user terminal and is thus the preferred frequency subset based on measurements where strongest interference is caused by a transmission of said at least one user terminal, or alternatively based on power levels from serving and interfering cells received by said at least one user terminal,
  allocation of said at least one user terminal to a group that is assigned to said frequency subset that is restricted in power and that provides for said improvement, if there is a potential for signal to interference ratio improvement, or allocation of said at least one user terminal to a group that is assigned to said preferred frequency subset,
  allocation of subcarriers of a dedicated frequency subset in equal clusters to user terminals that are allocated to the group that is assigned to the dedicated frequency subset,
  allocation of extended frequency bandwidth outside of said dedicated frequency subset in an amount offering the same data throughput as one of said equal clusters to the user terminals that are allocated to the group that is assigned to the dedicated frequency subset, when not enough subcarriers are left for allocation in said dedicated frequency subset, and allocation of extended frequency bandwidth that is not yet allocated out of other frequency subsets in an amount offering the same data throughput as one of said equal clusters to user terminals that do not belong to one of said groups, a user terminal for FDM transmission with interference coordination in a multi-cell or multi-sector network and with the frequency band used for FDM transmission being subdivided into at least two frequency subsets, wherein the user terminal comprises at least one processing means adapted for
  measurement of the received power levels from serving and interfering cells or sectors,
  determination of the cell or sector being the source for the strongest interference for said user terminal,
  and sending of said received power levels from serving and interfering cells or sectors to a base station and a network comprising base stations and user terminals using FDM transmission with interference coordination with the frequency band used for FDM transmission being subdivided into at least two frequency subsets, wherein the base station comprises at least one processing means adapted for
  either determination of a potential for signal to interference ratio improvement for at least one user terminal if said at least one user terminal is scheduled to a frequency subset that is restricted in power in a cell or sector being the source for the strongest interference for said at least one user terminal, based on the received power levels from serving and interfering cells or sectors measured by said at least one user terminal, or determination of a frequency subset that is dedicated to bear interference in the cell or sector that is receiving the strongest interference from said at least one user terminal and is thus the preferred frequency subset based on measurements where strongest interference is caused by a transmission of said at least one user terminal, or alternatively based on power levels from serving and interfering cells received by said at least one user terminal, allocation of said at least one user terminal to a group that is assigned to said frequency subset that is restricted in power and that provides for said improvement, if there is a potential for signal to interference ratio improvement, or allocation of said at least one user terminal to a group that is assigned to said preferred frequency subset, allocation of subcarriers of a dedicated frequency subset in equal clusters to user terminals that are allocated to the group that is assigned to the dedicated frequency subset, allocation of extended frequency bandwidth outside of said dedicated frequency subset in an amount offering the same data throughput as one of said equal clusters to the user terminals that are allocated to the group that is assigned to the dedicated frequency subset, when not enough subcarriers are left for allocation in said dedicated frequency subset, and allocation of extended frequency bandwidth that is not yet allocated out of other frequency subsets in an amount offering the same data throughput as one of said equal clusters to user terminals that do not belong to one of said groups, and that the user terminal comprises at least one processing means adapted for measurement of the received power levels from serving and interfering cells or sectors, determination of the cell or sector being the source for the strongest interference for said user terminal, and sending of said received power levels from serving and interfering cells or sectors to a base station.

BACKGROUND OF THE INVENTION

Frequency division multiplexing (FDM) transmission schemes such as Orthogonal Frequency Division Multiplexing (OFDM), single carrier Frequency Division Multiple Access (FDMA) or distributed FDMA such as interleaved FDMA with multiple terminals will become increasingly important e.g. for future evolutions of air interfaces for mobile radio systems. Those radio systems are currently under discussion e.g. in Third Generation Partnership Project (3GPP) Technical Specification Group (TSG) Radio Access Network (RAN), for Wireless Local Area Networks (WLANs) e.g. according to standard IEEE 802.11a, or for a 4$^{th}$ generation air interface.

Given the licensed bandwidth, transmission capacity from network providers e.g. for picture uploading or video communication has to be as high as possible for all users to serve as many subscribers as possible. Further the quality of service experienced by the user and especially the coverage of the service is an important property demanded by the user. So an access scheme shall work well at the cell borders of networks with frequency reuse.

In cellular systems with a frequency reuse factor of 1 the signal to interference ratio at the cell border can approach the factor 1 or 0 dB, so that no useful transmission from a user terminal to the base station can be kept up if a user terminal from a neighboring cell is near to the considered user terminal and sends with the same power on the same frequencies.

Therefore in CDMA (CDMA=Code Division Multiple Access) a soft handover exists and the user terminals always use a different (terminal specific) scrambling code in the uplink. The reception is then possible using the spreading gain from CDMA. As is known due to the strong interference the uplink capacity is considerably limited.

In FDM transmission, frequency groups are allocated to a user terminal instead of codes in CDMA transmission. In FDMA orthogonal transmission schemes, frequencies are also allocated to a user terminal. So in these schemes in contrast to CDMA transmission, interference can be planned and avoided. For these orthogonal transmission schemes the problem at the cell border has to be solved as well.

A known concept of frequency planning for the cells is giving each whole cell a distinct frequency band.

However, frequency distribution to the different cells reduces the available uplink resources per cell very considerably e.g. by a factor of 1/3 or 1/7 and thus the overall system throughput. It is a waste of resources for the inner area of a cell.

A frequency reuse of e.g. 1/3 only in the outer part of the cell is possible but still wastes too much resources.

A possible concept for coordination of the interference between cells of a network with frequency reuse offering a good usage of the available resources is to subdivide the overall frequency resource into frequency subsets. In every cell a dedicated frequency subset is used with a power restriction. This dedicated frequency subset is assigned by neighbouring cells to user terminals approaching this cell.

Such a concept for the downlink is e.g. disclosed in the document R1-05-0594 with the title "Multi-cell Simulation Results for Interference Co-ordination in new OFDM DL" presented at 3GPP TSG RAN WG1 LTE Ad Hoc on LTE in Sophia Antipolis, France, 20-21 Jun. 2005. For the uplink, such a concept is disclosed in the document R1-05-0593 with the title "Interference coordination for evolved UTRA uplink access" presented at RAN1 AdHoc on LTE, Sophia Antipolis, France, 20-21 Jun. 2005.

Independent of the distribution of user terminals within a cell, the user terminals have to be scheduled to subcarriers in a way to fully exploit the advantages of interference coordination in a multi-cell scenario, i.e. to guarantee a high cell throughput, and at the same time to guarantee a minimum bitrate performance for the individual user terminals.

The object of the invention is thus to propose a method for scheduling of user terminals to subcarriers in a multi-cell or multi-sector network using FDM transmission that guarantees a high cell throughput and a minimum bitrate performance for the individual user terminals.

This object is achieved by a method according to the teaching of claim 1, a base station according to the teaching of claim 5, a user terminal according to the teaching of claim 6 and a network according to the teaching of claim 8.

The main idea of the invention is to measure or to model by means of the signal to interference ratio measured by user terminals the data throughput of said user terminals dependent on the frequency subset and to allocate subcarriers preferably to user terminals with a high signal to interference ratio on said subcarriers.

Furthermore, subcarriers are allocated in clusters to the user terminals, whereby all clusters offer the same data throughput for the respective user terminal.

Further developments of the invention can be gathered from the dependent claims and the following description.

BRIEF DESCRIPTION OF THE DRAWINGS

In the following the invention will be explained further making reference to the attached drawings.

DETAILED DESCRIPTION OF THE INVENTION

Figure 1:
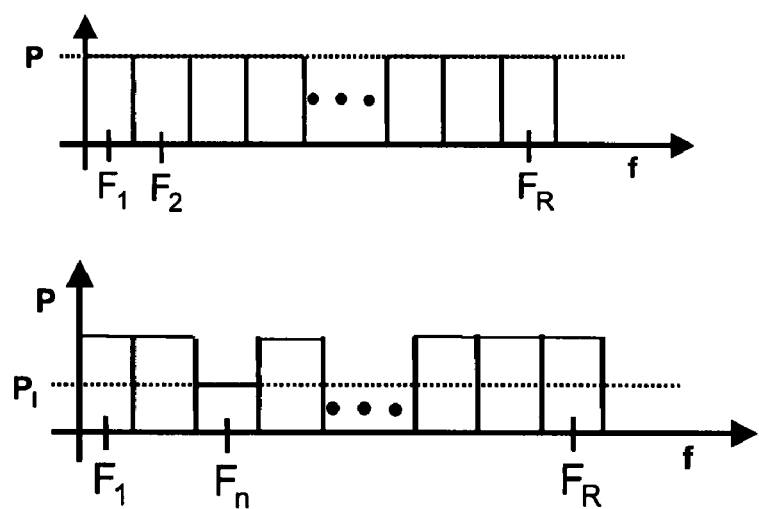
FIG. 1 schematically shows the partitioning of an OFDM or single carrier FDMA frequency band in this case disjoint subsets $F_x$ and the power restriction of a dedicated frequency subset $F_n$ in downlink.

A network according to the invention comprises user terminals and base stations.

Each of said user terminals is connected to one or multiple of said base stations, and the base stations are in turn connected via base station controllers to a core network.

The user terminals comprise the functionality of a user terminal for transmission and reception in a network for FDM transmission, i.e. they can be connected to a network by means of a base station. This can be used in uplink to determine based on reciprocity the target neighbor base station which is strongest affected by interference produced by the user terminal.

Furthermore, a user terminal according to the invention comprises at least one processing means adapted for measurement of the received power levels from serving and interfering cells or sectors, determination of the cell or sector being the source for the strongest interference for said user terminal and sending of said received power levels from serving and interfering cells or sectors to a base station.

The base stations comprise the functionality of a base station of a network for FDM transmission, i.e. they provide the possibility for user terminals to get connected to the network.

Furthermore, the base station according to the invention comprises at least one processing means adapted for
  either determination of a potential for signal to interference ratio improvement for at least one user terminal if said at least one user terminal is scheduled to a frequency subset that is restricted in power in a cell or sector being the source for the strongest interference for said at least one user terminal, based on the received power levels from serving and interfering cells or sectors of said at least one user terminal, determination of a frequency subset that is dedicated to bear interference in the cell or sector that is receiving the strongest interference from said at least one user terminal and is thus the preferred frequency subset based on measurements where strongest interference is caused by a transmission of said at least one user terminal, or alternatively based on power levels from serving and interfering cells received by said at least one user terminal,
  allocation of said at least one user terminal to a group that is assigned to said frequency subset that is restricted in power and that provides for said improvement, if there is a potential for signal to interference ratio improvement, or allocation of said at least one user terminal to a group that is assigned to said preferred frequency subset,
  allocation of subcarriers of a dedicated frequency subset in equal clusters to user terminals that are allocated to the group that is assigned to the dedicated frequency subset,
  allocation of extended frequency bandwidth outside of said dedicated frequency subset in an amount offering the same data throughput as one of said equal clusters to the user terminals that are allocated to the group that is assigned to the dedicated frequency subset, when not enough subcarriers are left for allocation in said dedicated frequency subset,
  and allocation of extended frequency bandwidth that is not yet allocated out of other frequency subsets that no group is assigned to offering the same data throughput as one of said equal clusters to user terminals that do not belong to one of said groups.

In the following, by way of example the method according to the invention is described in detail making reference to FIGS. 1 to 5.

The invention is based on partitioning the frequency band into frequency subsets. FIG. 1 shows in the upper part a number of R disjoint frequency subsets $F_1, F_2 \ldots F_R$ along the frequency axis f. All these frequency subsets can have the same maximum power value along the power axis p, i.e. all frequency subsets are used with the same maximum power. These frequency subsets may contain frequency diverse frequency patterns to be robust against a frequency selective fading channel. For simplicity they are depicted as blocks over the frequency axis f as given in FIG. 1.

A power planning for the use of frequency subsets out of the frequency bands by the base station of a specific cell is possible. Depending on to which cell a base station belongs, in the downlink a dedicated subset can only be used with a restricted power in the cell.

This power restriction is illustrated in the lower part of FIG. 1. Here, it can be seen that the dedicated subset Fn can only be used maximally with the restricted power pl.

Figure 2:
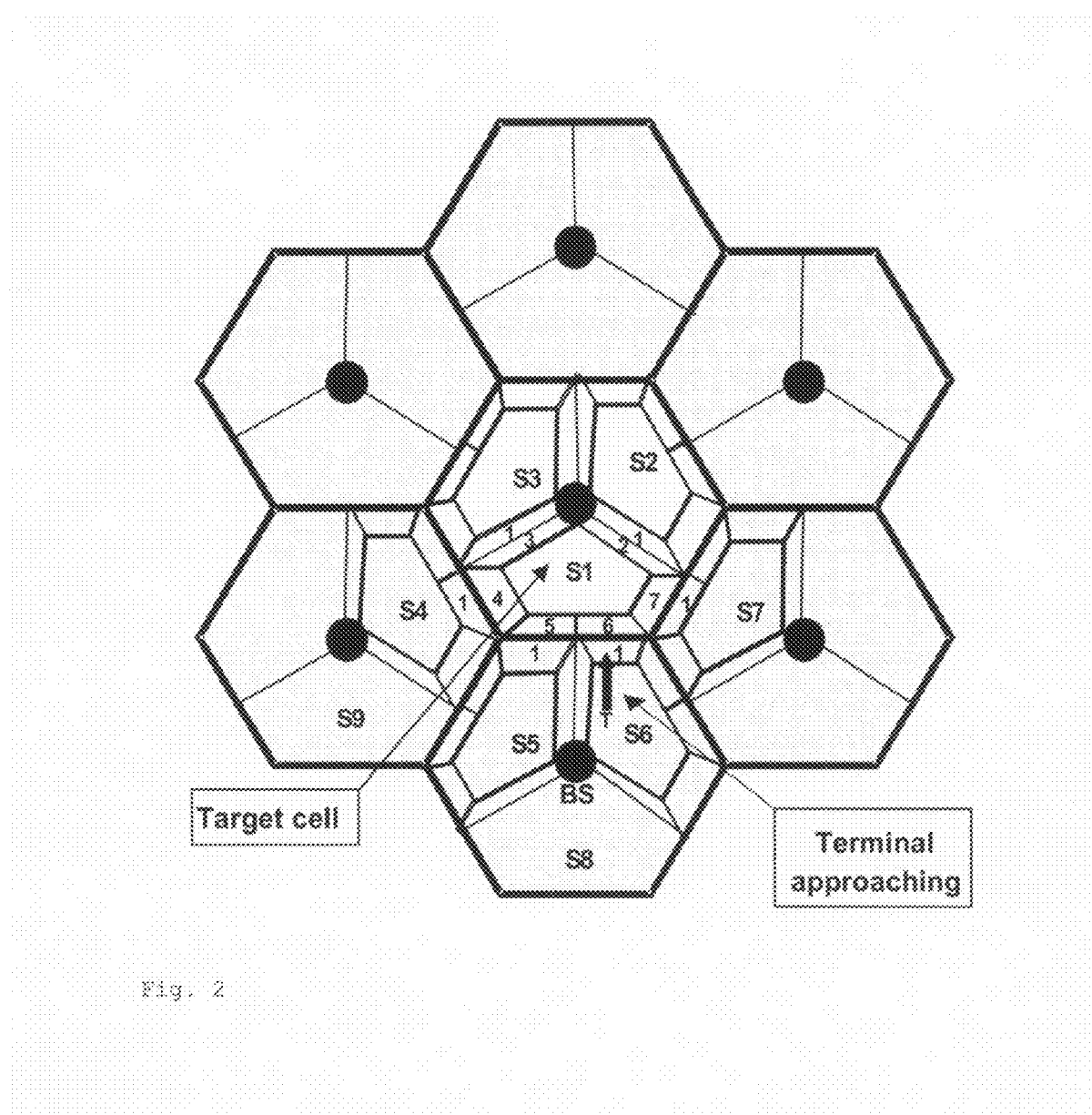
FIG. 2 schematically shows a sectorized cell pattern with allocation of dedicated frequency subsets to user terminals in border region.

In FIG. 2, an interference power planning is illustrated for sectorized hexagonal cells for the exemplary case of R=9 frequency subsets.

The sectors are denoted Sn with n indicating the dedicated frequency subset $F_n$ of the respective sector that is used with restricted power, or that is designated in uplink to be burdened by neighbor cell terminal interference and the frequency subsets $F_k$ that are preferably used by user terminals in the border regions of the sectors are denoted with the number k. In the inner area of the sectors, all frequency subsets are used for uplink or downlink but the respective dedicated subset $F_n$ is reduced in power in downlink or in uplink it is burdened more by interference and can only be used under observation of the strong inter-cell interference inside this inner area.

User terminals are distributed across cells and are allocated to a sector as serving sector in case of sectorized cells.

The serving sector is for example a sector where frequency subset $F_x$ is restricted in power.

The object of the invention is now to schedule the user terminals to subcarriers inside the serving sector Sx.

Depending on the received power from serving and interfering sectors it is decided whether a user terminal experiences improved signal to interference ratio in certain frequency subsets that are restricted in power in neighboring cells and are thus preferred frequency subsets for said user terminal or if all frequency subsets have the same signal to interference ratio and are thus equally appropriate for scheduling of said user terminal e.g. because it is in the inner area of the serving sector near to the antenna. Or in uplink based on measurements where strongest interference is caused, or alternatively based on power levels from serving and interfering cells received by the user terminal, the frequency subset is determined that is dedicated to bear interference in the nearest neighbor cell or sector and is thus the preferred frequency subset.

So the user terminals are sorted into groups or sets $\Theta_0$, $\Theta_1$, $\Theta_2$, ..., $\Theta_R$. The group $\Theta_0$ contains the user terminals that have no frequency subset preference probably because the user terminals are located near the antenna. All user terminals inside group $\Theta_i$ experience a sector with restrictions in the frequency subset $F_i$ as their strongest interfering sector. Since it is assumed that the frequency subset $F_x$ is restricted in power inside the serving sector Sx, the signal to interference ratio achievable in said frequency subset is restricted.

The number of user terminals inside each group is denoted $N_0, N_1, \ldots, N_R$ respectively. The user terminals itself can then also be denoted $T_{01}, T_{02}, \ldots T_{11}, T_{12}, T_{13}, \ldots T_{R1}, T_{R2}, T_{R3} \ldots$ and so on. Now, the data throughput potential for the user terminals has to be determined. Referring to the so-called Shannon limit, the data throughput in the limit would be $$C' = f_B \operatorname{ld}\left(1 + \frac{S}{I}\right).$$

In this formula $f_B$ denotes the bandwidth, S denotes the signal strength and I denotes the interference strength.

Figure 3:
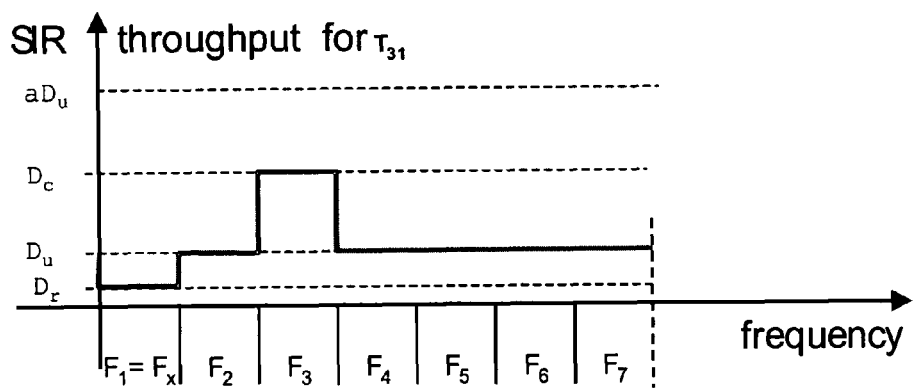
FIG. 3 schematically shows the throughput situation for a user terminal in the border region to a sector with frequency subset $F_3$ being restricted.

FIG. 3 shows the signal to interference ratio and consequently data throughput plotted against the frequency for a user terminal in the border region to a sector in which the use of frequency subset $F_3$ is restricted in power. The various frequency subsets are depicted along the frequency axis.

For frequencies out of the frequency subset $F_3$ an improved signal to interference ratio of maybe 3-4 dB due to interference coordination is experienced by the user terminal. For frequencies out of the frequency subsets $F_2, F_4, F_5$ etc. that are not used with restricted power inside the sector Sx signal to interference ratio of about 0 dB is experienced and for frequencies out of the frequency subset $F_x$ that is used with restricted power, a signal to interference ratio of only −10 dB or less is seen at the cell border.

From that information, the data throughput for a user terminals can be directly calculated depending on, from which part of the spectrum frequencies are allocated to the user terminal. Thus at the y-axis the data throughput values for frequencies enjoying interference coordination $D_c$ and for frequencies without improvement $D_u$ are denoted. The possible data throughput for frequencies that are restricted in power in the serving sector is denoted $D_r$. For a user terminal that is in the bad situation that it experiences as strongest interfering neighbor a sector in which the same frequency subset $F_x$ is restricted in power as in its serving sector, i.e. for a terminal from group $\Theta_x$, all frequencies can only be used with a signal to interference ratio of at most 0 dB. In the restricted frequency subset itself, because the second strongest interfering neighbor sector interferes with full power, a signal to interference ratio of only approx. −4 dB occurs. This results in a reduced data throughput for the frequency subset $F_x$.

For the user terminals that are in group $\Theta_0$, all frequency subsets besides $F_x$ can equally be used with high signal to interference ratio which will result in a high data throughput denoted $aD_u$ in FIG. 3, and the frequency subset $F_x$ can be used with reduced SIR which will result in a data throughput denoted $aD_r$.

In uplink in a similar way preferred and unpreferred subsets are given and due to the power limitation in non-preferred subsets required by the scheme throughput calculations can be done.

In the following the invention is disclosed for downlink transmission, but it can be applied to uplink transmission in an analogue way.

To a user terminal, normally frequencies from its preferred frequency subset are allocated, but if there are too many user terminals in the same cell region, a shortage of frequencies in the preferred frequency subset occurs. So it is seen that some user terminals need to share a preferred frequency subset while other user terminals have a whole preferred frequency subset on their own. In the case of shortage then also frequencies from other frequency subsets have to be allocated to the multiple user terminals.

Independent of the distribution of the user terminals in the cells, all user terminals have to be scheduled to subcarriers in a way to fully exploit the advantages of interference coordination in a multi-cell scenario and at the same time, a minimum bitrate performance has to be guaranteed.

The invention is now to use a scheduler that is parameterized and is optimally exploiting this situation. That is, the invention is that the data throughput situation for the user terminals over the R frequency subsets is simply modeled or determined by measurement and that the frequency bandwidth or the time-frequency resources over a dedicated number of transmission time intervals are distributed to the user terminals.

In a preferred embodiment, for maximization of the sector throughput the remaining frequency bandwidth is allocated to user terminals having the highest signal to interference ratio.

Thus, according to the invention, the frequency bandwidth or the time-frequency resources are allocated to the user terminals in border regions exploiting the improved data throughput in the preferred frequency subset as much as possible but also allocating unpreferred frequency subsets to user terminals in overpopulated border regions. Unpreferred frequency subsets or left over frequency bandwidth or time-frequency resources are also allocated to user terminals in the inner region of a cell. The approximate data throughput from said allocations is calculated for the user terminals.

In a preferred embodiment, said allocation of frequency bandwidth or time-frequency resources is done until a desired approximate data throughput $\text{Th}_{des}$, or a minimum data throughput is reached for all scheduled user terminals. The desired approximate data throughput $\text{Th}_{des}$ is a parameter that can be varied according to needs.

In a preferred embodiment, after said allocation, the remaining frequency bandwidth or time-frequency resources, if available at this scheduling instant, is distributed to user terminals in good reception or transmission conditions so as to maximize the sector throughput, which relates to the mean user terminal data throughput.

More specifically, based on the allocation of user terminals to groups, the approach is that the individual data throughput of the user terminals, i.e. the minimum user terminal data throughput or cell edge bitrate that can occur is especially taken care of and is made as large as possible.

Figure 4:
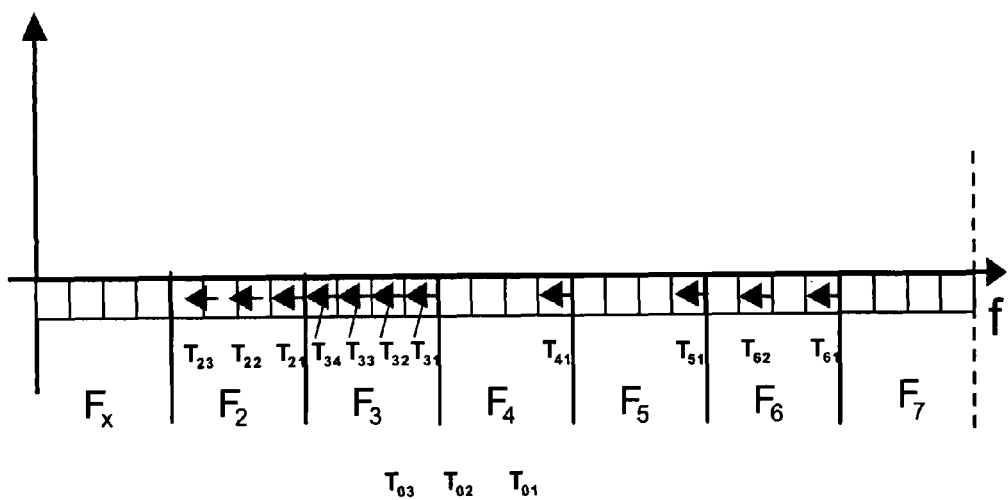
FIG. 4 schematically shows a frequency bandwidth allocation to user terminals arranged according to preferred frequency subsets $F_2$ to $F_7$.

The situation for distributing the preferred frequency subsets to the user terminals is shown in FIG. 4.

In FIG. 4, the allocation of frequency bandwidth to user terminals in a transmission time interval is schematically shown. The frequency bandwidth that is allocated to a user terminal is depicted as an arrow.

The number of user terminals allocated to each frequency subset can be different. According to the example shown in FIG. 4, for frequency subset $F_3$ there are four user terminals, for frequency subset $F_2$ there are three user terminals, for frequency subset $F_6$ there are two user terminals and for frequency subset $F_4$ and $F_5$ there is only one user terminal.

In each frequency subset now the preferred frequencies are allocated to the user terminals so that all user terminals do have the same data throughput. This can be thought in a way that for all user terminals according to the arrows inside the frequency subsets by successive allocation the frequencies are equally allocated. This can be performed until the frequency subset with the highest number of user terminals $F_3$ is completely distributed or used up. Then for the terminals $T_{31}$, $T_{32}$, $T_{33}$, $T_{34}$ frequencies from other unpreferred frequency subsets e.g. from $F_4$ have to be allocated. So one can say an extended bandwidth $f_{u1}$ from other frequency subsets has to be allocated additionally to said terminals $T_{31}$, $T_{32}$, $T_{33}$, $T_{34}$. Because for said extended bandwidth the signal to interference ratio is lower and the user terminals experience less data throughput per frequency or subcarrier compared to the preferred frequency subset, more subcarriers from the unpreferred frequency subsets have to be allocated in compensation to achieve the same user terminal data throughput. At the same time the other user terminals get also allocated further frequencies from their preferred frequency subset.

If one considers e.g. the case that the frequency subsets shall be used up and the frequency subsets of lower load are fully brought in to support the frequency subsets of overload one can note the formulas for e.g. two groups of user terminals. The user terminal data throughput $Th_a$ would then be $$Th_a = \frac{1}{N_1}(D_c f_{p1} + D_u f_{u1}) = \frac{1}{N_2}(D_c f_{p2}) \text{ with} \quad (1a)$$

$$f_{p1} = F_B = \frac{1}{R} \text{ and } f_{p2} < F_B \text{ if } N_1 > N_2$$

Thus it follows:

$$Th_a = \frac{1}{N_1}(D_c f_{p1} + D_u f_{u1}) = \frac{1}{N_2}(D_c f_{p2}) \wedge F_B + f_{u1} + f_{p2} = 2F_B \quad (1b)$$

In these formulas, $f_{p1}$ denotes the frequency bandwidth that is used from the preferred frequency subset of the first group, $f_{p2}$ denotes the frequency bandwidth that is used from the preferred frequency subset of the second group, and $f_{u1}$ denotes the frequency bandwidth that is used from an unpreferred frequency subset for user terminals of the first group.

These formulas could also be set up if one considers more than two, but all groups. Then also a system of multiple equations has to be solved.

Yet the question to find the frequency subsets that are completely filled by user terminals assigned to them and the frequency subsets that are only partly filled by assigned user terminals but also occupied by other user terminals is a multiple decision problem.

This balancing out between the groups is important for the cell edge bit rate compared to the case of scheduling without interference coordination. This is shown in the example shown in FIG. 5 for 5 groups and 8 user terminals.

Figure 5:
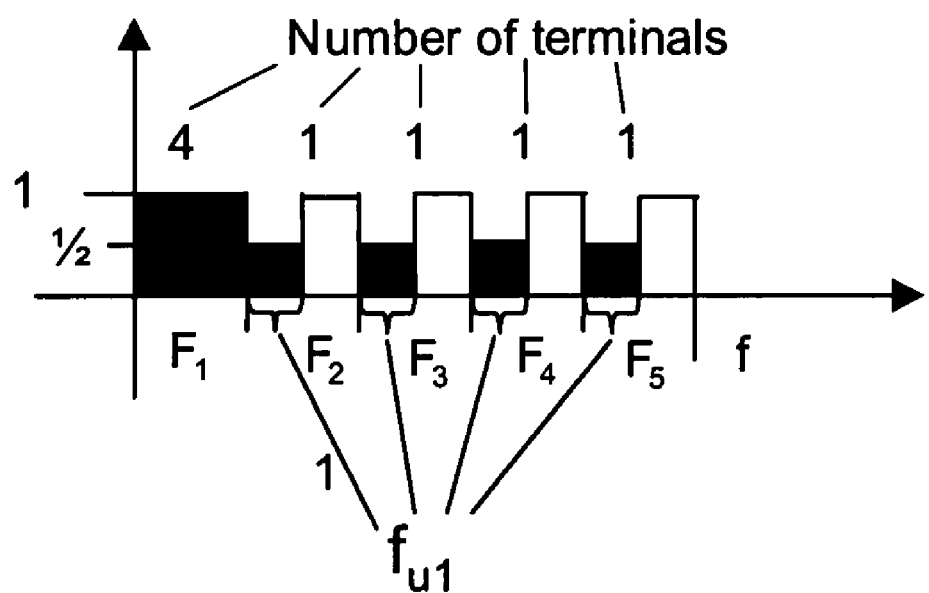
FIG. 5 schematically shows data throughput with interference coordination and balancing out between 8 user terminals.

In FIG. 5, the data throughput is plotted against 5 frequency subsets. Here the frequency bandwidth $F_B$ of a frequency subset is set to 1 and the uncoordinated data throughput $D_u$ is set to ½ and the coordinated data throughput $D_c$ is set to 1. The number of user terminals in the group allocated to the respective frequency subset is denoted in FIG. 5. Without interference coordination the data throughput is (½×5)/8 terminals=0.31.

The situation with interference coordination is depicted in FIG. 5. The first frequency subset $F_1$ is allocated to 4 user terminals, as this is their preferred frequency subset. Additionally, said 4 user terminals get frequency bandwidth allocated from the other 4 unpreferred frequency subsets, which is called balancing out. The data throughput of said 4 user terminals is depicted in black. The other 4 user terminals are all allocated to another preferred frequency subset $F_2$, $F_3$, $F_4$ or $F_5$. With interference coordination and balancing out, the throughput is (1+4×¼)/4 terminals=½=0.5 for each terminal. Without balancing out, the lowest data throughput for the four user terminals with the first frequency subset as their preferred frequency subset would be ¼ terminals=¼=0.25 which is lower than without using interference coordination. With balancing out there is still an improvement by interference coordination.

In order to solve this distribution problem according to our approach the following successive filling algorithm can be used for example.

The frequency subsets are partitioned in a number of Q fine parts e.g. with Q=100. This can be realized e.g. by considering Q transmission time intervals together and assuming stationary conditions and doing bitrate calculation over these Q transmission time intervals together. If $F_{ges}$ is the bandwidth of the whole allocatable spectrum, e.g. $F_{ges}$=5 MHz, the bandwidth per frequency subset is $$F_B = \frac{F_{ges}}{R}.$$

The minimal or quantized bandwidth that can be allocated to a user terminal is then $$\frac{F_B}{Q} = \frac{F_{ges}}{R \cdot Q} = F_\Delta.$$

The user terminals are sorted into groups as given above.

The desired user terminal data throughput is given in advance as $Th_{des}$.

The minimal user terminal data throughput $Th_{min}$ is set to $Th_{min}$=0. The remaining available bandwidth $F_{rem}$ is set to $$F_{rem} = Q \cdot R \frac{F_B}{Q} = Q \cdot R \cdot F_\Delta.$$

$F_{rem\,n}$ is the remaining bandwidth in the spectrum excluding $F_x$. It is useful for all user terminals independent of group membership. Therefore $F_{rem\,n}$ is set to $F_{rem\,n}$=$Q \cdot R \cdot F_\Delta - Q \cdot F_\Delta = Q(R-1) \cdot F_\Delta$. (The value $F_{rem\,x}$ is the remaining bandwidth in $F_x$. So $F_{rem\,x}$ is set to $F_{rem\,x}$=$Q \cdot F_\Delta$.)

One user terminal after the other is allocated incremental throughput $D_C \cdot F_\Delta$. As long as it is possible user terminals get only allocated from their preferred frequency subset. The bandwidth allocated in each frequency subset $F_{ai}$ and the remaining bandwidth $F_{rem\,n}$ and $F_{rem\,x}$ are counted. The bandwidth in $F_x$ can be distributed also. If there is a user terminal in group $\Theta_0$ at the end, the bandwidth is given to the $\Theta_0$-user terminal with the highest signal to interference ratio. If there is no $\Theta_0$-user terminal, the bandwidth can be given to another good positioned $\Theta_i$-user terminal with a high signal to interference ratio or it is not allocated.

For each round of allocations over all user terminals, the variable $Th_{min}$ is normally incremented (until the last low load region is filled) as $Th_{min}^{(new)} = Th_{min}^{(old)} + D_C \cdot F_\Delta$.

For user terminals in group $\Theta_x$ the amount $D_C/D_U \cdot F_\Delta \approx 2 \cdot F_\Delta$ is allocated in each allocation round until $Th_{des}$ is reached. This allocation can be thought to be in a preliminary region.

For user terminals in group $\Theta_0$ the data throughput is counted as $Th_{01}, Th_{02}, \ldots$. Depending on their signal to interference ratio the incremental bandwidth $F_\Delta$ is only allocated if $Th_{0i} < Th_{min}$ otherwise $F_\Delta$ is not allocated.

So this equal data throughput incrementing goes on until the most occupied frequency subsets e.g. $F_3$ are used up or until $Th_{min}$ reaches $Th_{dex}$.

Then the idea of the algorithm is that in the first case it goes on as before but for the user terminals in the already used up frequency subsets the allocation is done in unpreferred frequency subsets while the expected reduced signal to interference ratio is taken care of in the amount of frequency bandwidth that needs to be allocated in unpreferred frequency subsets.

So in detail, for the user terminals with a used up preferred frequency subset e.g. $T_{ij}$ the amount $F_{ext\,ij}$ of extension bandwidth is counted and is incremented by $(D_C/D_U) \cdot F_\Delta$. For the other regions the allocation goes on as before until $Th_{min}$ reaches $Th_{des}$ or until $F_{rem\,n}$ reaches 0.

If this is the case all the frequency spectrum needed for certain user terminals is allocated.

Now the preliminary regions have to be solved up and possibly remaining spectrum has to be allocated. For that the cases have to be distinguished whether there is a $\Theta_0$-user terminal or not.

If there is no user terminal in group $\Theta_0$ a special distribution DD takes place to first distribute $F_{rem\,n}$ bandwidth, before the algorithm goes on as given below.

If there is at least one $\Theta_0$-user terminal the distribution of the spectrum goes as written in the following.

Now for the user terminals in the already used up frequency subsets that have filled preliminary regions and for the $\Theta_x$-user terminals and the $\Theta_0$-user terminals the remaining spectrum is allocated in the amount as was calculated before. So for $T_{ij}$ for example $F_{ext\,ij}/F_\Delta$ increments of $F_\Delta$ are allocated from the first free frequency subset. This goes on until all preliminary regions are solved up again.

If $F_{rem\,n}$ or $F_{rem\,x}$ was greater than zero there is still some spectrum remaining. The idea is now that his spectrum is allocated to user terminals to boost the sector data throughput. So if a $\Theta_0$-user terminal is available the spectrum is totally allocated to the $\Theta_0$-user terminal with the best channel condition or if no $\Theta_0$-user terminal is available it is allocated to the user terminal from the available user terminals with the best channel condition as described in the special distribution DD. Thus the desired minimum user terminal throughput should be guaranteed while the maximum sector data throughput should be achieved.

Special distribution DD: The best $\Theta_i$-user terminals that are in only partially filled regions are identified and the preferred frequency subset is allocated to them in the amount of $F_{rem\,n}$. Then the preliminary regions are solved up as described already.

Since $Th_{des}$ can be changed the whole algorithm allows implementation of a parametric scheduler, which can be used to try out several settings.

The algorithm could also be used in a way until a certain $F_{rem} = F_{rem\,des}$ is reached.

In the following, a method for an analytic bandwidth calculation is proposed.

The scheduling algorithm can be thought of in the following way: First the virtual allocation amount or credits are calculated analytically and then the corresponding real allocation to user terminals is carried out on this basis, in a final step.

If one calculates the consumed bandwidth for each user terminal or group of user terminals depending on their reception condition assuming a given minimum user terminal data throughput, the total bandwidth consumed for this guaranteed bit rate scheduling can be calculated and it can be checked if it is below the total available bandwidth. If this is the case the remaining bandwidth is given to the user terminals in the best reception conditions to maximize the sector data throughput.

In this sense the step 5 to 7 of the method described above can now also be approximated analytically when the reference data rate $D_C \cdot F_\Delta$ that is allocated is counted by the number of virtual reservation cycles $\bar{c}$. Then it can be said that for a certain data throughput th for all user terminals in group $\Theta$hd i $$\frac{f_{pi}}{F_\Delta} = \bar{f}_{pi} = \min\left(\frac{th}{D_C \cdot F_\Delta} N_i, Q\right)$$

times the bandwidth out of the preferred frequency subset $F_i$ will be allocated. If the normalized data throughput is expressed in reservation cycles $\bar{c}$ the expression $\bar{f}_{pi} = \min(\bar{c}N_i, Q)$ is the number of $F_\Delta$ allocated out of $F_i$. Now as maximum $$\bar{c}_{pi}^{(max)} = \frac{Q}{N_i}$$

can be reached.

If the preferred subsets are used up $$\bar{f}_{ui}(\bar{c}) = \max\left[0, (\bar{c} - \bar{c}_{pi}^{(max)}) N_i \frac{D_C}{D_U}\right]$$

gives the amount of $F_\Delta$ that has to be allocated from unpreferred frequency subsets to get the desired terminal throughput if $i \neq x$ and $i \neq 0$.

So it can be calculated that the sum $$\sum_{\substack{i=1 \\ i \neq x}}^{R} \left\{\min(\bar{c}N_i, Q) + \max\left[0, (\bar{c} - \bar{c}_{pi}^{(max)}) N_i \frac{D_C}{D_U}\right]\right\}$$

gives the amount of bandwidth (in $F_\Delta$) used for all user terminals in the groups $\Theta_i$ with $i \neq x$ and $i \neq 0$. Using the definition $s_u = D_C/D_u$ and $s_h = D_C/(aD_u)$ the bandwidth (in $F_\Delta$) used for $\Theta_x$-user terminals and $\Theta_0$-user terminals is given by:

$$\bar{c}N_x s_u + \bar{c}N_0 s_h.$$

Now the total available bandwidth $F_{rem\ n} = (R-1) \cdot Q \cdot F_\Delta$ has to be larger than this bandwidth needed to achieve the data throughput or cycles $\bar{c}$. So the inequality:

$$(R-1)Q \geq \bar{c}(N_x s_u + N_0 s_h) + \sum_{\substack{i=1 \\ i \neq x}}^{R} \{\min(\bar{c}N_i, Q) + \max[0, (\bar{c} - \bar{c}_{pi}^{(max)})N_i s_u]\}$$

needs to be tested for $$\bar{c}_{des} = \frac{Th_{des}}{D_c \cdot F_\Delta}.$$

If it is not fulfilled $Th_{des}$ can not be reached in this scheduling instant. A certain value $\bar{c}_{max}$ is instead determined for which the corresponding equality is fulfilled.

In any case then $\bar{c}_{tot} = \min(\bar{c}_{max}, \bar{c}_{des})$ is determined.

Then the number of cycles with preferred allocation is given as $$\bar{c}_{pi} = \min(\bar{c}_{pi}^{(max)}, \bar{c}_{tot})$$

If $\bar{c}_{tot}$ is bigger than the number of maximum preferred cycles $\bar{c}_{pi}^{(max)}$ then the number of unpreferred cycles $\bar{c}_{ui}$ is given by $$\bar{c}_{ui} = \bar{c}_{tot} - \bar{c}_{pi}.$$

From that the number of preferred and unpreferred allocations (or credits) for the user terminals in group $\Theta_i$ is given by:

$$\bar{J}_{pi}(\bar{c}_{tot}) = N_i \cdot \bar{c}_{pi} \text{ and}$$

$$\bar{J}_{ui}(\bar{c}_{tot}) = N_i \cdot s_u \cdot \bar{c}_{ui}.$$

The user terminal group $\Theta_x$ now gets $$\bar{J}_x(\bar{c}_{tot}) = N_x \cdot s_u \cdot \bar{c}_{tot} \text{ allocations and finally}$$

the user terminal group $\Theta_0$ gets $$\bar{J}_0(\bar{c}_{tot}) = N_0 \cdot s_h \cdot \bar{c}_{tot} \text{ allocations (credits)}.$$

The number of allocations then has to be rounded to the next integer value. If the rounding up is not as frequent as rounding down it may happen that the allocation does not exactly match what is available as resources but this can simply be solved in a practical application in a real-time scheduler.

As next step of the scheduler, if there is bandwidth left over, this bandwidth is allocated e.g. to the $\Theta_0$-user terminal with highest signal to interference ratio to boost the sector throughput as described before.

As final step, based on the virtual allocations or credits the real allocations to the user terminals based on the credits take place using a real time scheduler that allocates $F_\Delta$ bandwidth portions to the terminals until all credits are used up.

The invention claimed is:

1. A method for scheduling of user terminals to subcarriers in a multi-cell or multi-sector network using FDM transmission with interference coordination and with the frequency band used for FDM transmission being subdivided into at least two frequency subsets, wherein Using a processor, either for at least one user terminal, the cell or sector being the source for the strongest interference for said at least one user terminal is determined, and based on the received power levels from serving and interfering cells or sectors measured by said at least one user terminal, a potential for signal to interference ratio improvement for said at least one user terminal is determined if said at least one user terminal is scheduled to a frequency subset that is restricted in power in said cell or sector being the source for the strongest interference for said at least one user terminal, or based on measurements where strongest interference is caused by a transmission of said at least one user terminal, or alternatively based on power levels from serving and interfering cells received by said at least one user terminal, the frequency subset is determined that is dedicated to bear interference in the cell or sector that is receiving the strongest interference from said at least one user terminal and is thus the preferred frequency subset, if there is a potential for signal to interference ratio improvement, said at least one user terminal is allocated to a group that is assigned to said frequency subset that is restricted in power and that provides for said improvement, or said at least one user terminal is allocated to a group that is assigned to said preferred frequency subset, subcarriers of a dedicated frequency subset are allocated in equal clusters to user terminals that are allocated to the group that is assigned to the dedicated frequency subset, when not enough subcarriers are left for allocation in said dedicated frequency subset, extended frequency bandwidth outside of said dedicated frequency subset is allocated in an amount offering the same data throughput as one of said equal clusters to the user terminals that are allocated to the group that is assigned to the dedicated frequency subset, and extended frequency bandwidth that is not yet allocated out of other frequency subsets is allocated in an amount offering the same data throughput as one of said equal clusters to user terminals that do not belong to one of said groups.

2. A method according to claim 1, wherein the data throughput for at least one user terminal over at least one frequency subset is determined by means of the signal to interference ratio.

3. A method according to claim 1, wherein over a dedicated number of transmission time intervals t subcarriers are allocated to user terminals until a desired or minimum data throughput over said dedicated number of transmission time intervals is calculated to be achieved in approximation or is achieved for the user terminals.

4. A method according to claim 3, wherein subcarriers that have not yet been allocated to user terminals are distributed to user terminals with the highest signal to interference ratio or best reception or transmission conditions in order to maximize the cell or sector throughput.

5. A base station for scheduling of user terminals to subcarriers in a multi-cell or multi-sector network using FDM transmission with interference coordination and with the frequency band used for FDM transmission being subdivided into at least two frequency subsets t wherein the base station comprises at least one processing means adapted for either determination of a potential for signal to interference ratio improvement for at least one user terminal if said at least one user terminal is scheduled to a frequency subset that is restricted in power in a cell or sector being the source for the strongest interference for said at least one user terminal, based on the received power levels from serving and interfering cells or sectors of said at least one user terminal, or determination of a frequency subset that is dedicated to bear interference in the cell or sector that is receiving the strongest interference from said at least one user terminal and is thus the preferred frequency subset based on measurements where strongest interference is caused by a transmission of said at least one user terminal, or alternatively based on power levels from serving and interfering cells received by said at least one user terminal, allocation of said at least one user terminal to a group that is assigned to said frequency subset that is restricted in power and that provides for said improvement, if there is a potential for signal to interference ratio improvement, or allocation of said at least one user terminal to a group that is assigned to said preferred frequency subset, allocation of subcarriers of a dedicated frequency subset in equal clusters to user terminals that are allocated to the group that is assigned to the dedicated frequency subset, allocation of extended frequency bandwidth outside of said dedicated frequency subset in an amount offering the same data throughput as one of said equal clusters to the user terminals that are allocated to the group that is assigned to the dedicated frequency subset, when not enough subcarriers are left for allocation in said dedicated frequency subset, and allocation of extended frequency bandwidth that is not yet allocated out of other frequency subsets in an amount offering the same data throughput as one of said equal clusters to user terminals that do not belong to one of said groups.

6. A user terminal for FDM transmission with interference coordination in a multi-cell or multi-sector network and with the frequency band used for FDM transmission being subdivided into at least two frequency subsets, wherein the user terminal comprises at least one processing means adapted for measurement of the received power levels from serving and interfering cells or sectors, determination of the cell or sector being the source for the strongest interference for said user terminal, allocation of the terminal to a group that is assigned to a frequency subset that is restricted in power and is separate from a preferred frequency subset that is dedicated to bear interference in the cell or sector that is receiving the strongest interference from said at least one user terminal, and provides for improvement, allocation of subcarriers of a dedicated frequency subset in equal clusters that are allocated to the group that is assigned to the dedicated frequency subset, allocation of extended frequency bandwidth outside of said dedicated frequency subset in an amount offering the same data throughput as one of said equal clusters to the user terminals that are allocated to the group that is assigned to the dedicated frequency subset, when not enough subcarriers are left for allocation in said dedicated frequency subset, and sending of said received power levels from serving and interfering cells or sectors to a base station.

7. A user terminal according to claim 6, wherein said at least one processing means is adapted to perform determination of the data throughput for the user terminal over at least one frequency subset by means of the signal to interference ratio.

8. A network comprising base stations and user terminals using FDM transmission with interference coordination with the frequency band used for FDM transmission being subdivided into at least two frequency subsets, wherein the base station comprises at least one processing means adapted for either determination of a potential for signal to interference ratio improvement for at least one user terminal if said at least one user terminal is scheduled to a frequency subset that is restricted in power in a cell or sector being the source for the strongest interference for said at least one user terminal, based on the received power levels from serving and interfering cells or sectors measured by said at least one user terminal, or determination of a frequency subset that is dedicated to bear interference in the cell or sector that is receiving the strongest interference from said at least one user terminal and is thus the preferred frequency subset based on measurements where strongest interference is caused by a transmission of said at least one user terminal, or alternatively based on power levels from serving and interfering cells received by said at least one user terminal, allocation of said at least one user terminal to a group that is assigned to said frequency subset that is restricted in power and that provides for said improvement, if there is a potential for signal to interference ratio improvement, or allocation of said at least one user terminal to a group that is assigned to said preferred frequency subset, allocation of subcarriers of a dedicated frequency subset in equal clusters to user terminals that are allocated to the group that is assigned to the dedicated frequency subset, allocation of extended frequency bandwidth outside of said dedicated frequency subset in an amount offering the same data throughput as one of said equal clusters to the user terminals that are allocated to the group that is assigned to the dedicated frequency subset, when not enough subcarriers are left for allocation in said dedicated frequency subset, and allocation of extended frequency bandwidth that is not yet allocated out of other frequency subsets in an amount offering the same data throughput as one of said equal clusters to user terminals that do not belong to one of said groups, and that the user terminal comprises at least one processing means adapted for measurement of the received power levels from serving and interfering cells or sectors, determination of the cell or sector being the source for the strongest interference for said user terminal, and sending of said received power levels from serving and interfering cells or sectors to a base station.

* * * * *